(12) United States Patent
Reynolds et al.

(10) Patent No.: US 8,950,735 B2
(45) Date of Patent: Feb. 10, 2015

(54) SHOCK ABSORBERS FOR PROTECTIVE BODY GEAR

(71) Applicants: Alexander Reynolds, Wayland, MA (US); Kyle Lamson, Chelmsford, MA (US)

(72) Inventors: Alexander Reynolds, Wayland, MA (US); Kyle Lamson, Chelmsford, MA (US)

(73) Assignee: Xenith, LLC, Lowell, MA (US)

( * ) Notice: Subject to any disclaimer, the term of this patent is extended or adjusted under 35 U.S.C. 154(b) by 0 days.

(21) Appl. No.: 14/046,482

(22) Filed: Oct. 4, 2013

(65) Prior Publication Data

US 2014/0097052 A1 Apr. 10, 2014

Related U.S. Application Data

(63) Continuation-in-part of application No. 13/325,728, filed on Dec. 14, 2011, now Pat. No. 8,814,150.

(51) Int. Cl.
*F16F 9/04* (2006.01)
*A42B 3/12* (2006.01)
*F16F 7/12* (2006.01)
*F16F 1/376* (2006.01)

(52) U.S. Cl.
CPC . *F16F 7/12* (2013.01); *F16F 7/127* (2013.01); *F16F 1/376* (2013.01); *A42B 3/121* (2013.01)
USPC .............. 267/139; 267/64.11; 2/413

(58) Field of Classification Search
CPC .............................. A41D 13/015; A42B 3/121
USPC ..................... 188/270; 267/136, 139, 140.11, 267/116–119, 64.27, 64.11, 270, 152, 267/140.13; 248/562, 566, 634; 2/411, 413
See application file for complete search history.

(56) References Cited

U.S. PATENT DOCUMENTS

| | | |
|---|---|---|
| 1,080,690 A | 12/1913 | Hipkiss |
| 1,552,965 A | 9/1925 | Smith |
| 1,560,825 A | 11/1925 | Kelticka |
| 2,296,355 A | 9/1942 | Levin |
| 2,759,186 A | 8/1956 | Dye |
| 3,039,109 A | 6/1962 | Simpson |
| 3,144,247 A | 8/1964 | Szonn et al. |
| 3,174,155 A | 3/1965 | Pitman |
| 3,202,412 A | 8/1965 | Trask |
| 3,231,454 A | 1/1966 | Williams |

(Continued)

FOREIGN PATENT DOCUMENTS

| | | |
|---|---|---|
| CA | 2176859 A1 | 12/1996 |
| CA | 2407462 A1 | 11/2001 |

(Continued)

OTHER PUBLICATIONS

Examination Report in Canadian Patent Application No. 2,663,728, mailed on Jan. 16, 2014, 3 pages.

(Continued)

*Primary Examiner* — Anna Momper
(74) *Attorney, Agent, or Firm* — Morgan, Lewis & Bockius LLP

(57) ABSTRACT

Shock absorbers for integration into protective structures generally take the form of hollow, compressible cells. The cell enclosure may be configured to provide for two or more compression stages. For example, in various embodiments, the cell enclosure includes one or more corrugations descending from the top wall, which, upon contact with the bottom wall, contribute to impact absorption.

8 Claims, 11 Drawing Sheets

(56) References Cited

U.S. PATENT DOCUMENTS

| | | | |
|---|---|---|---|
| 3,242,500 A | 3/1966 | Derr | |
| 3,447,163 A | 6/1969 | Tojeiro et al. | |
| 3,487,417 A | 12/1969 | Morgan | |
| 3,487,471 A | 1/1970 | Hagen | |
| 3,500,475 A | 3/1970 | Otsuka | |
| 3,574,379 A | 4/1971 | Jordan | |
| 3,600,714 A | 8/1971 | Cade et al. | |
| 3,609,764 A | 10/1971 | Morgan | |
| 3,666,220 A | 5/1972 | Rider | |
| 3,666,310 A | 5/1972 | Charno et al. | |
| 3,668,704 A | 6/1972 | Conroy et al. | |
| 3,713,640 A | 1/1973 | Margan | |
| 3,747,968 A | 7/1973 | Hornsby | |
| 3,782,511 A | 1/1974 | Parfitt | |
| 3,784,985 A | 1/1974 | Conroy | |
| 3,811,467 A | 5/1974 | Jones | |
| 3,849,801 A * | 11/1974 | Holt et al. | 2/413 |
| 3,872,511 A | 3/1975 | Nichols | |
| 3,877,076 A | 4/1975 | Summers et al. | |
| 3,900,222 A | 8/1975 | Muller | |
| 3,971,583 A | 7/1976 | Kornhauser | |
| 3,984,595 A | 10/1976 | Stephens | |
| 3,999,220 A | 12/1976 | Keltner | |
| 4,023,213 A * | 5/1977 | Rovani | 2/413 |
| 4,037,273 A | 7/1977 | Labaire | |
| 4,038,700 A | 8/1977 | Gyory | |
| 4,064,565 A | 12/1977 | Griffiths | |
| 4,067,063 A | 1/1978 | Ettinger | |
| 4,075,717 A | 2/1978 | Lemelson | |
| 4,098,434 A | 7/1978 | Uhlig | |
| 4,099,759 A | 7/1978 | Kornhauser | |
| 4,105,236 A | 8/1978 | Haar | |
| 4,124,904 A | 11/1978 | Matthes | |
| 4,134,156 A | 1/1979 | Gyory | |
| 4,191,370 A | 3/1980 | Imatt et al. | |
| 4,192,699 A | 3/1980 | Lewicki et al. | |
| 4,213,202 A | 7/1980 | Larry | |
| 4,218,807 A | 8/1980 | Snow | |
| 4,282,610 A | 8/1981 | Steigerwald et al. | |
| 4,370,754 A | 2/1983 | Donzis | |
| 4,432,099 A | 2/1984 | Grick et al. | |
| 4,441,751 A | 4/1984 | Wesley | |
| 4,453,271 A | 6/1984 | Donzis | |
| 4,472,472 A | 9/1984 | Schultz | |
| 4,534,068 A | 8/1985 | Mitchell et al. | |
| 4,564,959 A | 1/1986 | Zahn | |
| 4,566,137 A | 1/1986 | Gooding | |
| 4,568,102 A | 2/1986 | Dauvergne | |
| 4,586,200 A | 5/1986 | Poon | |
| 4,627,114 A | 12/1986 | Mitchell | |
| 4,642,814 A | 2/1987 | Godfrey | |
| 4,700,411 A | 10/1987 | Kawasaki et al. | |
| 4,704,746 A | 11/1987 | Nava | |
| 4,710,984 A | 12/1987 | Asper et al. | |
| 4,724,549 A | 2/1988 | Herder et al. | |
| 4,883,299 A | 11/1989 | Bonar | |
| 4,916,759 A | 4/1990 | Arai | |
| 4,937,888 A | 7/1990 | Straus | |
| 4,970,729 A | 11/1990 | Shimazaki | |
| 5,042,859 A | 8/1991 | Zhang et al. | |
| 5,056,162 A | 10/1991 | Tirums | |
| 5,058,212 A | 10/1991 | Kamata | |
| 5,083,320 A | 1/1992 | Halstead | |
| 5,093,938 A | 3/1992 | Kamata | |
| 5,098,124 A | 3/1992 | Breed et al. | |
| 5,161,261 A | 11/1992 | Kamata | |
| 5,204,998 A | 4/1993 | Liu | |
| 5,235,715 A | 8/1993 | Donzis | |
| 5,263,203 A | 11/1993 | Kraemer et al. | |
| 5,319,808 A | 6/1994 | Bishop et al. | |
| 5,334,646 A | 8/1994 | Chen | |
| 5,336,708 A | 8/1994 | Chen | |
| 5,343,569 A | 9/1994 | Asare et al. | |
| 5,345,614 A | 9/1994 | Tanaka | |
| 5,382,051 A * | 1/1995 | Glance | 280/751 |
| 5,388,277 A | 2/1995 | Taniuchi | |
| 5,412,810 A | 5/1995 | Taniuchi | |
| 5,500,951 A | 3/1996 | Marchello | |
| 5,548,848 A | 8/1996 | Huybrechts | |
| 5,561,866 A | 10/1996 | Ross | |
| 5,575,017 A | 11/1996 | Hefling et al. | |
| 5,678,885 A | 10/1997 | Stirling | |
| 5,713,082 A | 2/1998 | Bassette et al. | |
| 5,734,994 A | 4/1998 | Rogers | |
| 5,764,271 A | 6/1998 | Donohue | |
| 5,794,271 A | 8/1998 | Hastings | |
| 5,846,063 A | 12/1998 | Lakic | |
| 5,867,840 A | 2/1999 | Hirosawa et al. | |
| 5,872,511 A | 2/1999 | Ohkuma | |
| 5,881,395 A | 3/1999 | Donzis | |
| 5,911,310 A | 6/1999 | Bridgers | |
| 5,916,664 A | 6/1999 | Rudy | |
| 5,943,706 A | 8/1999 | Miyajima et al. | |
| 5,950,243 A | 9/1999 | Winters et al. | |
| 5,956,777 A | 9/1999 | Popovich | |
| 6,026,527 A | 2/2000 | Pearce | |
| 6,058,515 A | 5/2000 | Kitahara | |
| 6,065,158 A | 5/2000 | Rush | |
| 6,073,271 A | 6/2000 | Alexander et al. | |
| 6,098,209 A | 8/2000 | Bainbridge et al. | |
| 6,260,212 B1 | 7/2001 | Orotelli et al. | |
| 6,332,226 B1 | 12/2001 | Rush, III | |
| 6,349,599 B1 | 2/2002 | Lynnworth et al. | |
| 6,351,853 B1 | 3/2002 | Halstead et al. | |
| 6,394,432 B1 | 5/2002 | Whiteford | |
| 6,401,262 B2 | 6/2002 | Bacchiega | |
| 6,425,141 B1 | 7/2002 | Ewing et al. | |
| 6,434,755 B1 | 8/2002 | Halstead et al. | |
| 6,446,270 B1 | 9/2002 | Durr | |
| 6,453,476 B1 | 9/2002 | Moore, III | |
| 6,467,099 B2 | 10/2002 | Dennis et al. | |
| 6,519,873 B1 | 2/2003 | Buttigieg | |
| 6,560,787 B2 | 5/2003 | Mendoza | |
| 6,565,461 B1 | 5/2003 | Zatlin | |
| 6,604,246 B1 | 8/2003 | Obreja | |
| 6,658,671 B1 | 12/2003 | Von Holst et al. | |
| 6,665,884 B1 | 12/2003 | Demps et al. | |
| 6,681,408 B2 | 1/2004 | Ku | |
| 6,694,529 B1 | 2/2004 | Chiu | |
| 6,704,943 B2 | 3/2004 | Calonge Clavell | |
| 6,803,005 B2 | 10/2004 | Dennis et al. | |
| 6,839,910 B2 | 1/2005 | Morrow et al. | |
| 6,908,209 B2 | 6/2005 | Miller | |
| 6,925,657 B2 | 8/2005 | Takahashi et al. | |
| 6,934,971 B2 | 8/2005 | Ide et al. | |
| 7,146,652 B2 | 12/2006 | Ide et al. | |
| 7,188,375 B2 | 3/2007 | Harrington | |
| 7,444,687 B2 | 11/2008 | Sato et al. | |
| 7,578,074 B2 | 8/2009 | Ridinger | |
| 7,774,866 B2 | 8/2010 | Ferrara | |
| 7,895,681 B2 | 3/2011 | Ferrara | |
| 8,388,020 B2 * | 3/2013 | Ciplijauskas et al. | 280/743.1 |
| 8,528,119 B2 | 9/2013 | Ferrara et al. | |
| 2002/0023291 A1 | 2/2002 | Mendoza | |
| 2003/0221245 A1 | 12/2003 | Lee et al. | |
| 2004/0117896 A1 | 6/2004 | Madey et al. | |
| 2004/0168246 A1 | 9/2004 | Phillips | |
| 2004/0261157 A1 | 12/2004 | Talluri | |
| 2007/0075469 A1 | 4/2007 | Yamazaki | |
| 2007/0190292 A1 | 8/2007 | Ferrara | |
| 2007/0190293 A1 | 8/2007 | Ferrara | |
| 2007/0198292 A1 | 8/2007 | Ash et al. | |
| 2008/0155735 A1 | 7/2008 | Ferrara | |
| 2008/0256686 A1 * | 10/2008 | Ferrara | 2/413 |
| 2010/0025902 A1 | 2/2010 | Hofmann et al. | |
| 2010/0186150 A1 | 7/2010 | Ferrara et al. | |
| 2010/0186158 A1 | 7/2010 | Morita et al. | |
| 2010/0282554 A1 | 11/2010 | Stone | |
| 2011/0047685 A1 | 3/2011 | Ferrara et al. | |
| 2012/0266366 A1 | 10/2012 | Ferrara | |
| 2013/0152284 A1 | 6/2013 | Ferrara et al. | |
| 2013/0153350 A1 | 6/2013 | Ferrara et al. | |

(56) References Cited

U.S. PATENT DOCUMENTS

FOREIGN PATENT DOCUMENTS

| | | | |
|---|---|---|---|
| DE | 3619282 | A1 | 12/1987 |
| DE | 4336665 | A1 | 5/1995 |
| FR | 1572542 | A | 6/1969 |
| FR | 2561887 | A1 | 10/1985 |
| GB | 1316722 | A | 5/1973 |
| GB | 1503483 | A | 3/1978 |
| GB | 2287435 | A | 9/1995 |
| JP | 3-282031 | A | 12/1991 |
| JP | 4-4332 | A | 1/1992 |
| WO | 92/04210 | A1 | 3/1992 |
| WO | 96/14768 | A1 | 5/1996 |
| WO | 2006/005143 | A1 | 1/2006 |
| WO | 2006/089098 | A1 | 8/2006 |
| WO | 2006/089234 | A2 | 8/2006 |
| WO | 2006/089235 | A1 | 8/2006 |
| WO | 2012/045169 | A1 | 4/2012 |

OTHER PUBLICATIONS

Examination Report in Canadian Patent Application No. 2,681,439, mailed on Feb. 7, 2014, 3 pages.
Examination Report in Canadian Patent Application No. 2,820,137, mailed on Sep. 30, 2013, 3 pages.
Extended Search Report issued for European Patent Application No. 11250730.6, mailed on Dec. 9, 2013, 6 pages.
International Application Serial No. PCT/US2007/021050, International Search Report and Written Opinion mailed on Aug. 22, 2008, 9 pages.
International Application Serial No. PCT/US2010/000211, International Search Report and Written Opinion mailed on May 17, 2010, 10 pages.
Barth et al., "Acceleration-Deceleration Sport-Related Concussion: The Gravity of It All", Journal of Athletic Training, vol. 36, No. 3, Sep. 2001, pp. 253-256.
Edizone.com, Available online at <http://www.edizone.com/technologies.html>, 2 pages.
Hernandez, Hayden, "Novel Helmet Liner Technology", pp. 1-6.

* cited by examiner

SHOCK ABSORBERS FOR PROTECTIVE BODY GEAR

CROSS-REFERENCE TO RELATED APPLICATION

The instant application is a continuation-in-part of U.S. patent application Ser. No. 13/325,728, filed on Dec. 14, 2011, which is hereby incorporated herein by reference in its entirety.

TECHNICAL FIELD

The present invention relates generally to shock absorbers for use in protective structures such as body gear.

BACKGROUND

During sports and other physical activity, individuals are often exposed to impact forces that, if not at least partially attenuated, can cause severe injury. Therefore, they usually wear protective sporting gear, such as helmets, shields, elbow and knee pads, etc. Such protective gear typically includes impact-attenuating structures that deform elastically and/or plastically in response to an impact force, thereby mechanically attenuating the impact. For example, many helmets have a crushable foam layer disposed between a rigid or semi-rigid outer shell and an inner liner that conforms the helmet to the wearer's head.

Foams are generally customized to respond optimally to a specific range of impact energies, but outside this range, their effectiveness is significantly reduced. For impact energies exceeding the high end of the range, the foam is too soft and "bottoms out"—i.e., reaches maximum compression—before the impact is fully attenuated, resulting in the transfer of high impact forces to the body. For impact energies below the optimal range, on the other hand, the foam is too hard to compress, or "ride down," sufficiently to adequately prolong the distance and time over which deceleration occurs following impact, resulting in sudden, high peak forces. The only way to improve the impact-attenuating capability of a foam layer is, typically, to decrease the density of the foam (i.e., make it softer) and increase the thickness of the layer, which results in an undesirable increase in the amount of material used. Exacerbating this trade-off, the maximum ride-down distance for most foams is only about 30-40% of the original height. Thus, about 60-70% of the foam layer add to the bulk and weight, but not the impact-absorption capacity, of the protective structure. In addition, the performance of many foams degrades rapidly with repeated impacts. Other conventional impact-absorbing layers exhibit similar problems and limitations.

More recent helmet designs feature, in place of a continuous layer, discrete compression cells, which attenuate the impact with their side walls and/or by resistively venting a fluid through an orifice of the cell enclosure. These cells generally have ride-down distances close to their height, exhibit superior durability, and adapt to a wide range of impact energies. Furthermore, they provide opportunities for tailoring the impact-absorption characteristics of the helmet (or other protective structure) via the cell design. Such customization opportunities, however, have rarely been exploited.

SUMMARY

The present invention provides shock absorbers for integration into protective structures, such as, for example, helmets and other protective body gear, as well as dashboards, shock-absorbing seating, and safety padding in vehicles, sporting equipment, and machinery. The shock absorbers generally take the form of hollow, fluid-filled (e.g., air-filled), compressible cells, and typically absorb the impact in multiple stages. In various embodiments, different portions and features of the cell enclosure contribute to shock-absorption at different times throughout the impact by resistively yielding in response thereto. In addition, in some embodiments, the cell enclosure includes one or more small orifices, or vents, through which the fluid (e.g., air or water) resistively vents, providing an additional impact-attenuating mechanism that operates in conjunction, simultaneously or in sequence, with resistive yielding of the enclosure. For example, in some embodiments, the cell attenuates impact forces by resisting compression at least initially through both the enclosure (or walls) and the fluid, and following an initial stage of the impact, the walls may yield to allow the remainder of the impact to be attenuated via resistive fluid-venting. In alternative embodiments, an opening in the cell enclosure that allows fluid to escape is so large as to have no (or no significant) impact-resisting effect. Various embodiments of the present invention are directed to improving the energy management characteristics of the shock absorbers by tailoring the structure and shape of the enclosure, and/or the size and shape of the vents.

The compression cells may include top, bottom, and side walls, and may (but need not necessarily) be symmetrical around an axis through the center points of the top and bottom walls. For example, the cells may be disk-shaped or cylindrical. The side walls may be of uniform or varying thickness, and may be, without limitation, straight, angled, curved, or frusto-conical, depending on the impact absorption profile desired for the particular application. In certain embodiments, two frusto-conical portions of the side walls are arranged back-to-back such that the walls toe in toward a medial plane, accelerating the reduction of the inner volume as the cell collapses. In other embodiments, the frusto-conical portions are arranged such that their larger ends meet at the medial plane. The exterior shape of the cell may be adjusted to the protective structure in which it is integrated. For example, shock absorbers for use in helmets may have rounded (rather than planar) top walls to better fit between the interior liner and the shell, and/or side walls that taper toward one side to better accommodate the narrow space along the periphery of the helmet.

The top wall may include one or more corrugations that may contact the opposing wall during a late stage of compression, thereby effectively increasing the number of vertical walls that contribute to impact absorption. These corrugations may form rings surrounding a central portion of the top wall. In some embodiments, the central portion is raised above the height of the side wall, providing a separate mechanism that contributes to impact absorption initially, prior to buckling of the side wall. In various embodiments, depression of the central portion of the top wall, buckling of the side wall, and buckling of the corrugation(s) upon contact with the bottom wall start sequentially, forming three impact-absorption stages (which may partially overlap).

Accordingly, in one aspect, the present invention pertains to a compressible cell for attenuating impact forces imparted thereto. The cell includes a hollow (e.g., cylindrically symmetric) enclosure having a top wall including a corrugation (or multiple corrugations) defining a periphery around a central portion of the top wall, a (corrugated or non-corrugated) bottom wall, and a side wall extending between the top and bottom walls; the corrugation descends to a depth below half a height of the side wall. The corrugation(s) may form two ring walls meeting at a trough of the corrugation. The center portion of the top wall may be higher than the side wall. The top wall, side wall, and corrugation(s) may cooperate to attenuate impact forces imparted on the top wall. In some embodiments, the side wall includes two frusto-conical wall portions meeting at an intermediate plane of the cell (e.g., at about half the height of the side wall). The inner surfaces of the two frusto-conical wall portions may include an obtuse angle. The cell may further include an orifice in the top wall for venting fluid from an interior of the cell.

In another aspect, the invention pertains to a compressible cell for attenuating impact forces imparted thereto in three stages. The cell includes a hollow enclosure having (a) a top wall with a raised central portion and one or more corrugations around a periphery of the raised central portion, (b) a bottom wall, and (c) a side wall extending between the top and bottom walls, the corrugation(s) descending to a depth below half a height of the side wall. Impact forces imparted on the cell are attenuated in a first stage by resistive yielding of part of the at least one corrugation to allow for depression of the central portion (in other words, by partial resistance to such depression), in a second stage by resistive yielding of the side wall (i.e., by partial resistance to compression and/or buckling of the side wall), and in a third stage, upon contact of the at least one corrugation with the bottom wall, by resistive yielding of the at least one corrugation. The enclosure may be configured to cause overlap in time between any combination of the first, second, and third stages. In some embodiments, the side wall includes two frusto-conical wall portions meeting at an intermediate plane (e.g., at about half the height) of the cell. The inner surfaces of the two frusto-conical wall portions may include an obtuse angle. The cell may further include an orifice in the top wall for resistively venting fluid from an interior of the cell. The enclosure may be substantially cylindrically symmetric. The corrugation(s) may form two ring walls meeting at a trough of the corrugation.

In another aspect, the invention relates to a method for staged attenuation of impact forces imparted on a compressible cell including a hollow enclosure having a top wall with at least one corrugation around a periphery of a raised central portion of the top wall, a bottom wall, and a side wall extending between the top and bottom walls, the at least one corrugation extending to a depth below half a height of the side wall. The method includes attenuating the impact forces by resistively yielding to depression of the central portion of the top wall; when a height of the central portion has reached the height of the side wall, attenuating the impact forces with the side wall by resistive yielding thereof; and when the at least one corrugations contacts the bottom wall, attenuating the impact forces with the at least one corrugation by resistive yielding thereof. The enclosure may have an orifice (e.g., in the top wall), and the method may further include attenuating the impact forces at least partially by resistively venting fluid from an interior of the enclosure through the orifice.

In another aspect, the invention relates to a compressible cell for attenuating impact forces imparted thereto. In various embodiments, the cell comprises an enclosure defining an inner chamber for containing a fluid; the enclosure includes a side wall, extending and varying in thickness between a top wall and a bottom wall, that resistively yields in response to an impact imparted to the top wall. The side wall may increase or decrease in thickness from the top to the bottom wall. The resistance of the yielding side walls may increase with increasing energy of the impact and/or increased compression of the side wall. The cell may shear in response to a non-perpendicular impact force. In various embodiments, the cell further comprises at least one orifice in the enclosure for resistively venting fluid from the inner chamber so as to at least partially attenuate the impact when the side wall yields.

In another aspect, the invention relates to a method involving a safety article that comprises a compressible cell including an enclosure defining an inner chamber and having a side wall extending and increasing in thickness between a top wall and a bottom wall, where the safety article is worn on a body with the bottom wall closer to the body than the top wall. The method is directed toward protecting the body from damage due to impacts and comprises, in various embodiments, attenuating an impact imparted on the top wall at least partially with the side wall by resistively yielding, where resistance to yielding increases with increased compression of the side wall. In various embodiments, the enclosure has an orifice and the method further comprises attenuating the impact at least partially by venting fluid from the inner chamber through the orifice.

In a further aspect, the invention relates to a method involving a safety article that comprises a compressible cell including an enclosure defining an inner chamber and having a side wall extending and decreasing in thickness between a top wall and a bottom wall, where the safety article is worn on a body with the bottom wall closer to the body than the top wall. The method is directed toward protecting the body from damage due to impacts and comprises, in various embodiments, attenuating a tangential component of an impact imparted on the top wall at least partially by shearing, and attenuating a normal component of the impact imparted on the top wall at least partially with the side wall by resistively yielding. In some embodiments, the enclosure has an orifice and the method further comprises attenuating the impact at least partially by venting fluid from the inner chamber through the orifice.

In another aspect, the invention pertains to a compressible cell for attenuating impact forces imparted thereto. In various embodiments, the cell comprises an enclosure defining an inner chamber for containing a fluid; the enclosure comprises a top wall including one or more corrugations defining a periphery around a central portion of the top wall, a bottom wall, and a side wall extending between the top and bottom walls. The side wall and corrugation(s) of the top wall resistively yield in response to an impact imparted to the top wall so as to attenuate impact forces while allowing the cell to compress. In various embodiments, the cell further comprises at least one orifice in the enclosure for resistively venting fluid from the inner chamber so as to at least partially attenuate the impact. The corrugation(s) may increase resistance to compression of the cell as they contact the bottom wall. In various embodiments, the top wall is configured to allow lateral movement of a center region thereof relative to a periphery thereof. Furthermore, the side wall may vary in thickness between the top wall and the bottom wall.

The cell may be configured for use between an exterior shell and an interior liner of an impact-attenuating helmet, in which case the top wall may be domed so as to conform to the inner surface of the exterior shell. Moreover, the enclosure may be tapered at the top wall so as to fit between the shell and the liner in a peripheral region of the helmet.

In still a further aspect, the invention relates to a method involving a safety article that comprises a compressible cell including an enclosure defining an inner chamber, a top wall having one or more corrugations defining a periphery around a central portion of the top wall, a bottom wall, and a side wall extending between the top and bottom walls. The safety article is worn on a body with the bottom wall closer to the body than the top wall. The method is directed toward protecting the body from damage due to impacts and comprises, in various embodiments, attenuating an impact imparted on the top wall at least partially with the side wall and the corrugation(s) of the top wall by resistive yielding thereof. In some embodiments, the enclosure has an orifice and the method further comprises attenuating the impact at least partially by venting fluid from the inner chamber through the orifice.

In yet another aspect, the invention pertains to a compressible cell for attenuating impact forces imparted thereto, and which, in various embodiments, comprises an enclosure defining an inner chamber for containing a fluid; the enclosure comprises at least one side wall extending between a top wall and a bottom wall, and the side wall(s) resistively yield in response to an impact imparted to the top wall so as to allow the cell to compress. The top wall and/or the bottom wall comprises one or more vertically extending features that increase resistance to compression of the cell as the top wall approaches the bottom wall. In some embodiments, the cell further comprises at least one orifice in the enclosure for resistively venting fluid from the inner chamber so as to at least partially attenuate the impact. The feature(s) may comprise one or more corrugations defining a periphery around a central portion of the top wall and/or a plurality of concentrically arranged ridges on the bottom wall. In some embodiments, the side wall varies in thickness between the top wall and the bottom wall. The cell may be configured for use between an exterior shell and an interior liner of an impact-attenuating helmet, with the top wall being domed so as to conform to the inner surface of the exterior shell. The enclosure may be tapered at the top wall so as to fit between the shell and the liner in a peripheral region of the helmet.

In still a further aspect, the invention relates to a method involving a safety article that comprises a compressible cell including an enclosure defining an inner chamber, a side wall, and top and bottom walls at least one of which includes one or more vertically extending features. The safety article is worn on a body with the bottom wall closer to the body than the top wall. The method is directed toward protecting the body from damage due to impacts and in various embodiments comprises, in response to an impact imparted to the top wall, attenuating the impact at least partially with the side wall by resistive yielding thereof; and attenuating the impact at least partially with the vertically extending feature(s) as the top wall approaches the bottom wall. The enclosure may have an orifice, and the method may further comprise attenuating the impact at least partially by venting fluid from the inner chamber through the orifice.

In a further aspect, the invention pertains to a compressible cell for attenuating impact forces imparted thereto, and which, in various embodiments, comprises an enclosure defining an inner chamber for containing a fluid; the enclosure compresses in response to an impact. The cell also includes at least one orifice in the enclosure for resistively venting fluid from the inner chamber during the compression so as to at least partially attenuate the impact, and a valve for partially obstructing the orifice so as to increase resistance to the compression. In various embodiments the enclosure comprises top and bottom walls, and the resistance to the compression of the cell is increased by the partial obstruction of the orifice as the top wall approaches the bottom wall. Some or all of the walls may resistively yield in response to the impact, thereby partially attenuating the impact while allowing the cell to compress. In various embodiments, the valve comprises a pin protruding from the bottom wall opposite the orifice, where the pin, in a compressed state of the cell, engages the orifice so as restrict fluid venting therethrough.

Alternatively, the valve may comprise a tubular protrusion extending downward from the top wall and surrounding the orifice. The tubular protrusion self-restricts the orifice due to increased fluid turbulence.

Yet another aspect of the invention relates to a method involving a safety article that comprises a compressible cell that includes an enclosure defining an inner chamber and having an orifice and a valve therein. The method is directed toward protecting the body from damage due to impacts and comprises, in various embodiments, attenuating an impact imparted on the enclosure at least partially by resistively venting fluid from the inner chamber through the orifice, whereby the enclosure compresses, during compression of the enclosure, increasing a resistance to compression by partially and increasingly obstructing the orifice with the valve.

Still another aspect of the invention pertains to a compressible cell for use between an exterior shell and an interior liner of an impact-attenuating helmet. In various embodiments, the cell comprises an enclosure comprising a top wall, a bottom wall, and at least one side wall that resists yielding in response to an impact at least during an initial phase thereof, the enclosure defining an inner chamber for containing a fluid; and at least one orifice in the enclosure for resistively venting fluid from the inner chamber so as to at least partially attenuate the impact after the initial phase, wherein the top wall is domed so as to conform to an inner surface of the exterior shell.

In yet another aspect, the invention relates to a protective helmet comprising an exterior shell, an interior liner placed inside the shell, and, disposed between the shell and the liner, at least one compressible cell comprising (i) an enclosure defining an inner chamber and comprising a top wall, a bottom wall, and side walls that resist yielding in response to an impact at least during an initial phase thereof, the top wall being domed so as to conform to an inner surface of the exterior shell, and (ii) at least one orifice in the enclosure for resistively venting fluid from the inner chamber so as to at least partially attenuate the impact after the initial phase.

In a further aspect, the invention pertains to a compressible cell for use between an exterior shell and an interior liner of an impact-attenuating helmet. In various embodiments, the cell comprises an enclosure including a top wall, a bottom wall, and side walls that resist yielding in response to an impact at least during an initial phase thereof, the enclosure defining an inner chamber for containing a fluid; and at least one orifice in the enclosure for resistively venting fluid from the inner chamber so as to at least partially attenuate the impact after the initial phase, wherein the enclosure is tapered at the top wall so as to fit between the shell and liner in a peripheral region of the helmet.

In another aspect, the invention relates to a protective helmet comprising an exterior shell; an interior liner placed inside the shell, where the distance between the exterior shell and the liner decreases in a peripheral region of the helmet; and disposed between the shell and the liner, at least one compressible cell comprising (i) an enclosure defining an inner chamber and comprising a top wall, a bottom wall, and side walls that resist yielding in response to an impact at least during an initial phase thereof, the enclosure being tapered at the top wall so as to fit between the shell and the liner in the peripheral region of the helmet, and (ii) at least one orifice in the enclosure for resistively venting fluid from the inner chamber so as to at least partially attenuate the impact after the initial phase.

BRIEF DESCRIPTION OF THE DRAWINGS

The foregoing will be more readily understood from the following detailed description, in particular, when taken in conjunction with the drawings, in which.

DETAILED DESCRIPTION

Shock absorbers in accordance herewith can be fabricated from a variety of elastic and semi-elastic materials, including, for example, rubbers, thermoplastics, and other moldable polymers. A particularly suited material, due its durability, resiliency, and amenability to blow molding or injection molding, is thermoplastic elastomer (TPE); commercially available TPEs include the ARNITEL and SANTOPRENE brands. Other materials that may be used include, for example, thermoplastic polyurethane elastomers (TPUs) and low-density polyethylene (LDPE). In general, the material selection depends on the particular application, and can be readily made, without undue experimentation, by a person of skill in the art based on known material properties. Further, the desired shape and configuration of the shock absorber enclosure can generally be created using any of a number of well-known manufacturing techniques, such as, e.g., blow molding or injection molding. The shock absorber may be manufactured in one piece, or in two or more parts that are subsequently bonded together to form a fluid-tight enclosure. Bonding may be accomplished, for example, with an adhesive (such as glue), or using a thermal bonding process. Mechanically interlocking features, clamps, or similar devices may be used to assure that the multiple parts remain affixed to each other.

Figure 1A:
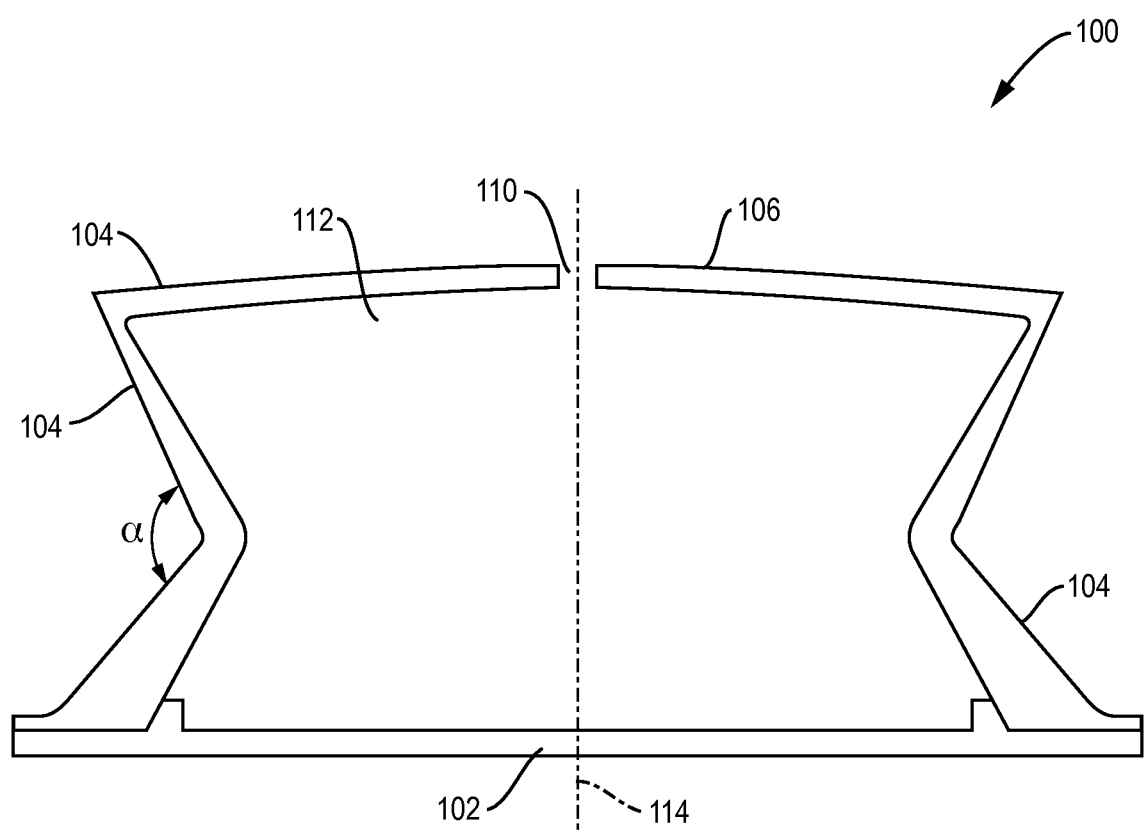
FIG. 1A is a schematic cross-sectional view of a shock absorber enclosure in accordance with one embodiment, which features side walls including an exterior obtuse angle and increasing in thickness toward the bottom plate.

FIG. 1A schematically illustrates an exemplary shock absorber cell 100 in accordance with various embodiments. The cell includes a flat bottom plate 102 and, secured thereto, a cap 104 forming the top wall 106 and side walls 108 of the structure. An orifice or vent 110 through the top wall 106 allows fluid to exit from the interior chamber 112 formed by the cell enclosure as the cell is compressed during an impact, as well as to enter the chamber as the cell returns to its original shape following the impact. Although only one orifice is shown, various embodiments use multiple orifices of the same or different shapes and sizes. The orifice(s) need not go through the top wall, but may generally be located in any portion of the cell enclosure. Further, instead of being simple holes or slits, the orifices may be equipped with valve structures that regulate flow therethrough. For example, in some embodiments, check valves that allow only inflow are provided at the bottom wall of the cell, and check valves that permit only outflow are included in the top wall, or vice versa. Alternatively, in some embodiments, the enclosure includes a larger opening that allows air to flow in and out of the cell substantially without encountering resistance; in this case, the impact is absorbed largely mechanically through deformation of the enclosure. In still other embodiments, the enclosure does not allow for fluid-venting at all such that fluid compression in the cell contributes to the cell's overall resistance to compression.

Returning to FIG. 1A, the side walls 108 form two back-to-back frusto-conical portions that meet with their narrower end at a horizontal plane located between the top and bottom walls 106, 102, such that they define an obtuse exterior angle α. Thus, when the cell 100 collapses, the side walls 108 move inward toward a central axis 114 of the cell, thereby reducing the volume of the cell and further compressing the air therein. This may result in increased turbulence of the air escaping through the orifice 110 and, thus, in increased resistance to compression. Further, as shown, the side walls 108 increase in thickness between the top and bottom walls. As a result, the resistance that the walls 108 themselves provide to the impact increases steadily throughout the duration of the compression. As will be readily apparent to one of skill in the art, variations of the wall thickness along its height can generally be used to tailor the temporal energy management profile of the cell, as characterized, for example, in terms of the residual force transmitted through the cell as a function of time.

Figure 1B:
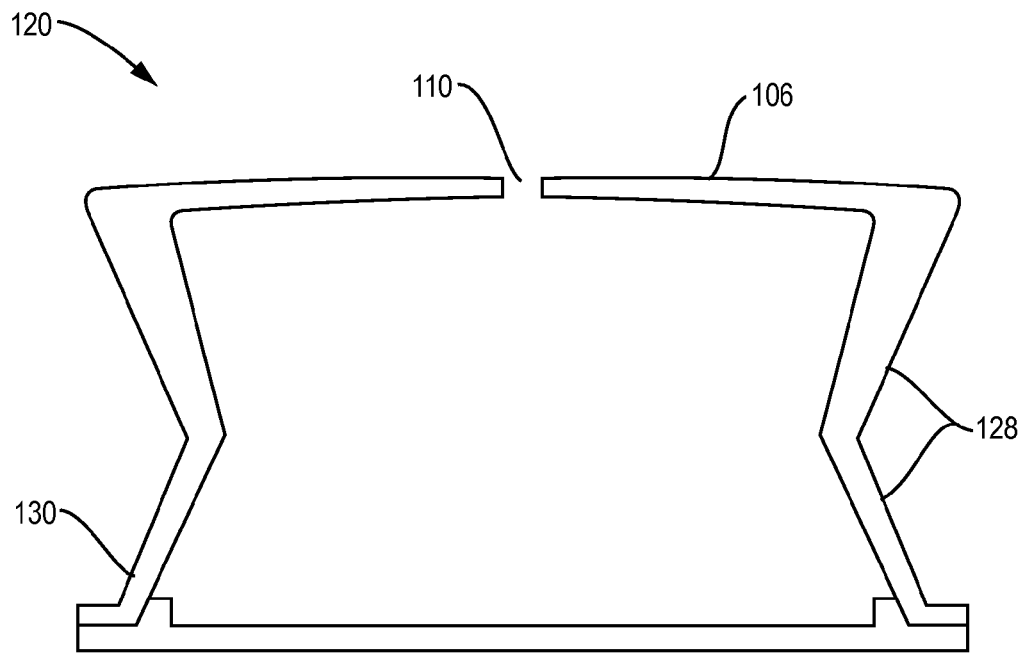
FIG. 1B is a schematic cross-sectional view of a shock absorber enclosure in accordance with one embodiment, which features side walls including an exterior obtuse angle and decreasing in thickness toward the bottom plate.

FIG. 1B illustrates an alternative compression cell 120, in which the thickness of the side walls 128 increases toward the top wall 106. (Other than that, the cell 120 is similar to the cell 100 depicted in FIG. 1A.) The thin portion 130 of the wall 128 near the bottom plate 102 constitutes a "weak spot" of the cell enclosure, which allows the cell to initially shear in response to an impact force that includes a component parallel to the top surface (i.e., a tangential force), thereby dissipating tangential forces. During later phases of the impact, energy is absorbed via compression of the thicker wall portions near the top wall 106.

Figure 1C:
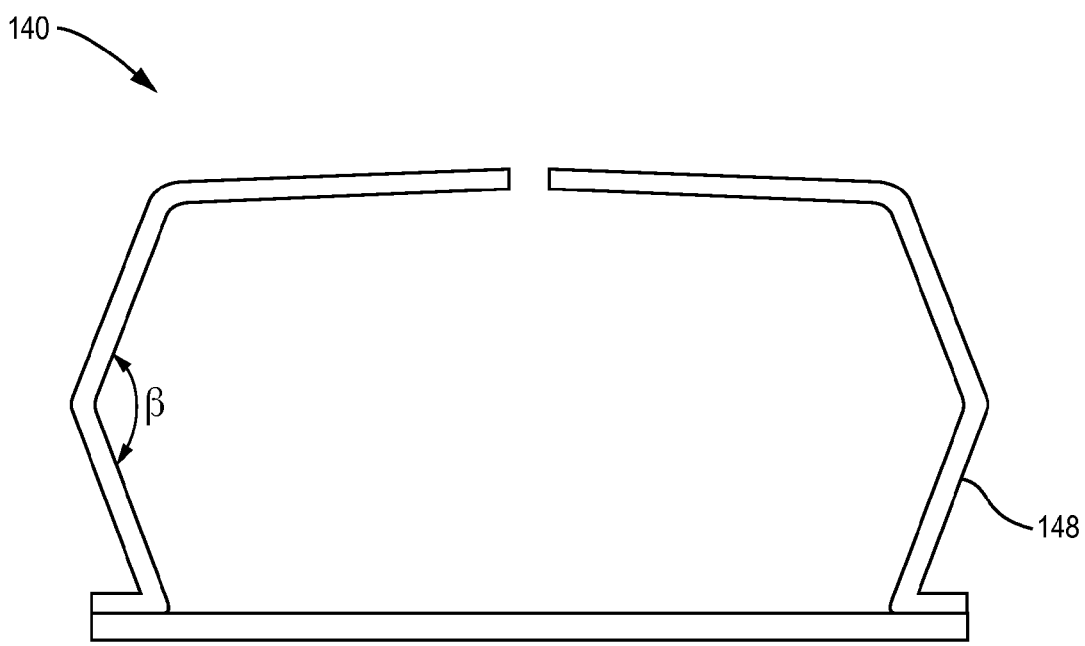
FIG. 1C is a schematic cross-sectional view of a shock absorber enclosure in accordance with one embodiment, which features side walls of uniform thickness that include an interior obtuse angle.

FIG. 1C shows yet another shock absorber structure 140, which includes walls of substantially uniform thickness. In this embodiment, the side walls 148 are angled so as to define an interior obtuse angle β, and, consequently, they collapse outwardly. Accordingly, the cell enclosure provides somewhat lower resistance to collapse then that of the cells 100, 120 with inverted walls depicted in FIGS. 1A and 1B. These and other cell wall designs may be combined with additional features as described below.

Figure 2:
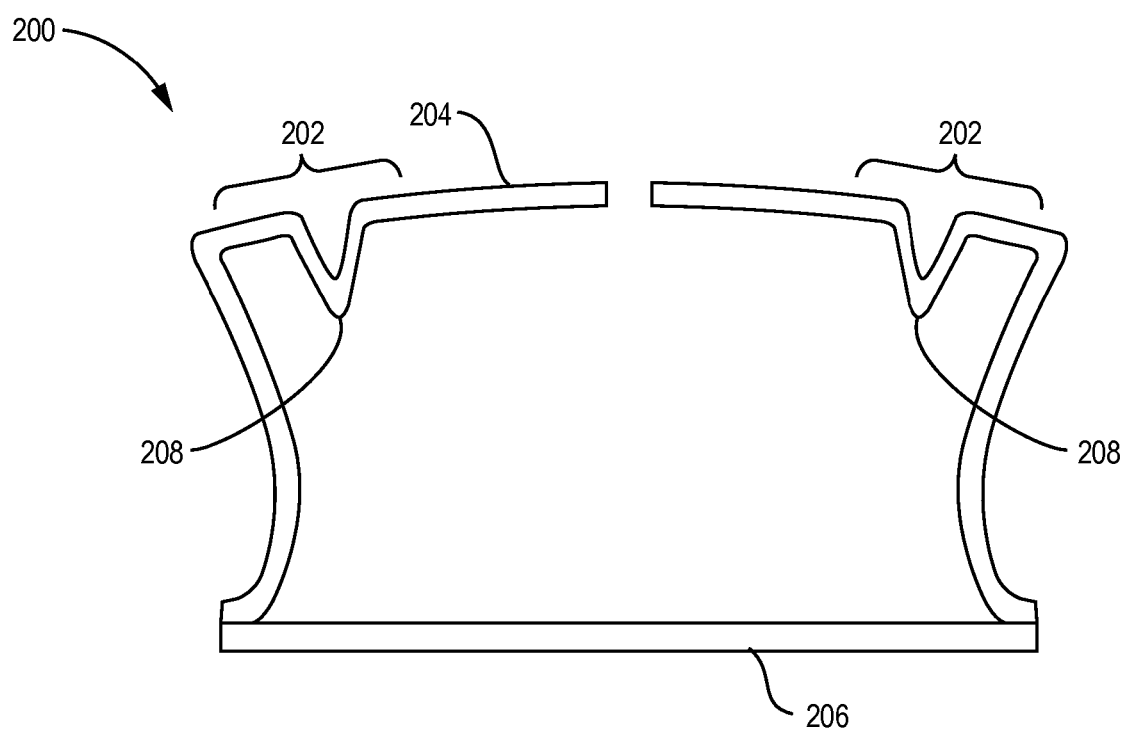
FIG. 2 is a schematic cross-sectional view of a shock absorber enclosure in accordance with one embodiment, which features a corrugation in the top wall.

In some embodiments, the top and/or bottom walls of the shock absorber are not flat (as depicted in FIGS. 1A-1C), but include one or more corrugations or features vertically protruding therefrom. Such features can provide increased resistance during late stages of cell compression. For example, FIG. 2 shows a shock-absorber cell 200 with a "V-shaped" corrugation 202 in the top wall 204 defining a circular periphery around the center portion of the top wall 204. As the cell is 200 compressed, the top wall 204 approaches the bottom wall 206, and the lowest points 208 of the corrugation 202 eventually contact the bottom wall 206. Effectively, this increases the number of side walls against which the impact forces work and, thus, inhibits further compression of the cell 200. As a result, the shock absorber cell 200 can withstand larger impact forces before it bottoms out. Moreover, flexure of the corrugation 202 facilitates lateral motion of the center region of the top wall 204 relative to the periphery in response to shear forces. Thus, in addition to increasing the cell's resistance to normal forces, the corrugation 202 helps dissipating shear forces.

Figure 3A:
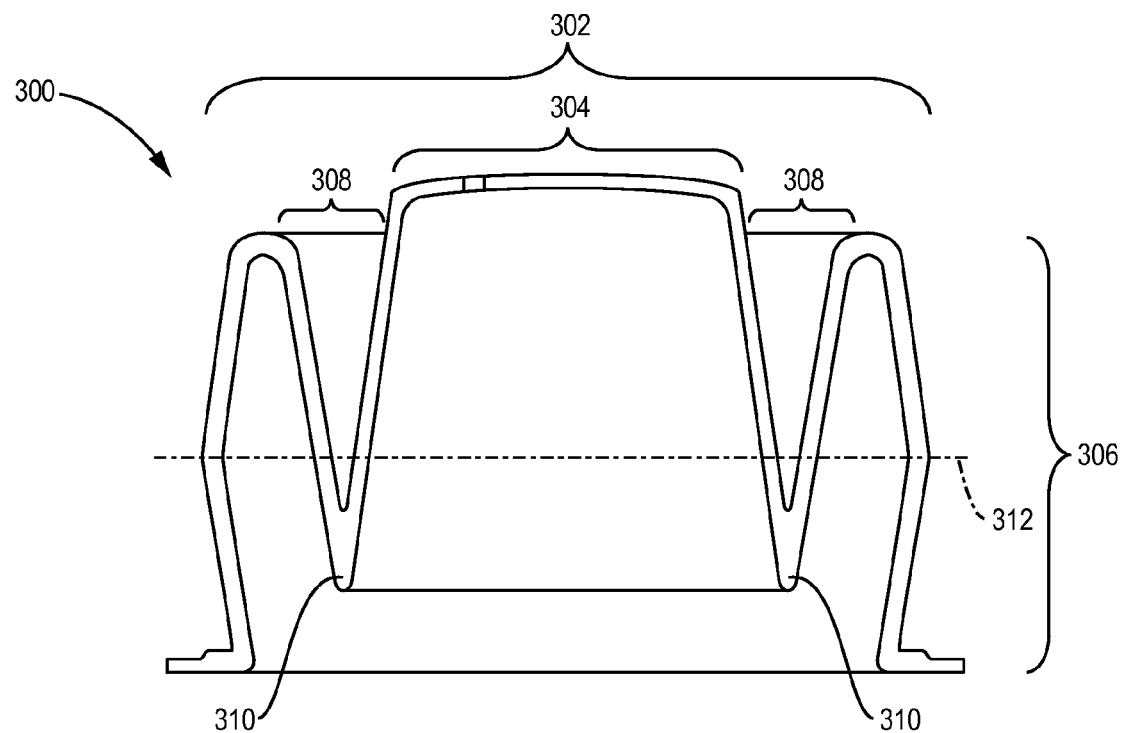
FIGS. 3A and 3B are a side view and a cut-away view, respectively, of a shock absorber enclosure with a deep corrugation in accordance with various embodiments.
Figure 3B:
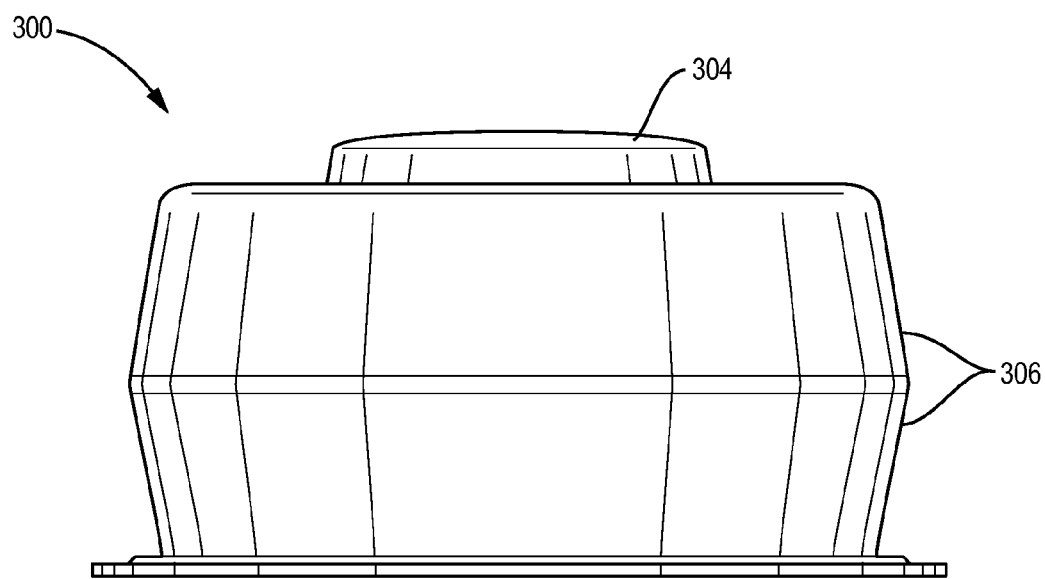

The contribution of the corrugation(s) in the top wall to the overall impact-absorbing characteristics of the shock absorber can be tailored via the number and dimensions of the corrugation(s). The depth of the corrugation(s), in particular, affects the point in time during compression at which the corrugation(s) start significantly resisting compression due to contact with the bottom surface. In various advantageous embodiments, the corrugation(s) descend down below half the height of the side wall, preferably down to below 40% of the height. FIG. 3A illustrates an exemplary embodiment of such a shock absorber (showing only the cap 300 and omitting the bottom wall). As shown, the top wall 302 of the shock absorber may include a (typically circular) central portion 304 that is raised above the height of the side walls 306; this features is also illustrated in FIG. 3B in a side view of The V-shaped corrugation 308 forms a periphery around this central portion 304. The trough 310 of the corrugation 308 (i.e., the tip of the "V") is positioned significantly below a medial plane 312, where the two frusto-conical portions forming the side wall 306 of the depicted shock absorber meet.

Figure 4A:
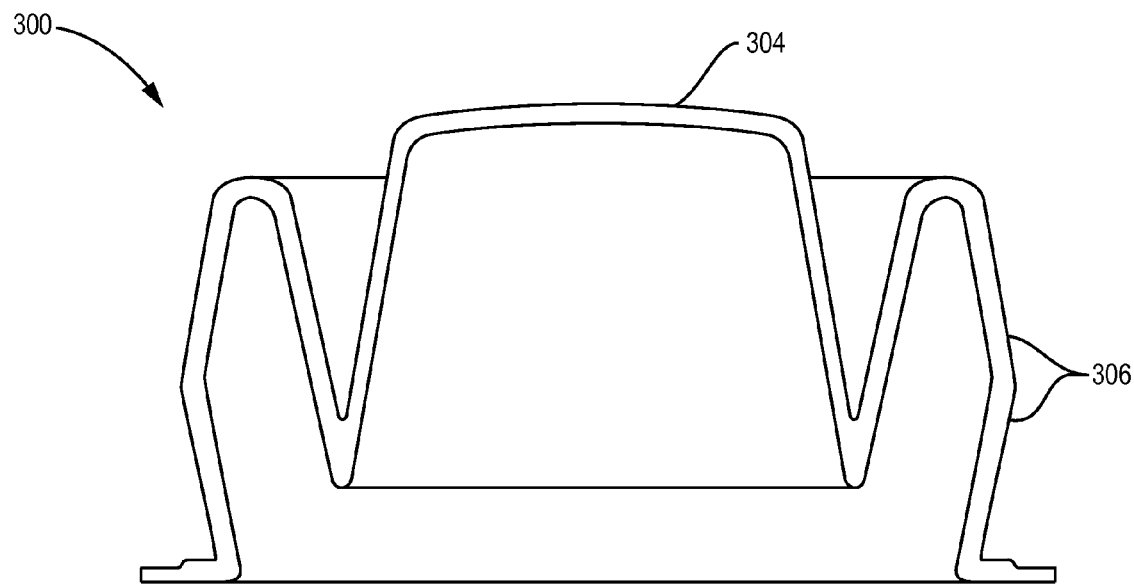
FIGS. 4A-4E are cut-away views of the shock absorber of FIGS. 3A and 3B, illustrating multiple compression stages in accordance with various embodiments.
Figure 4B:
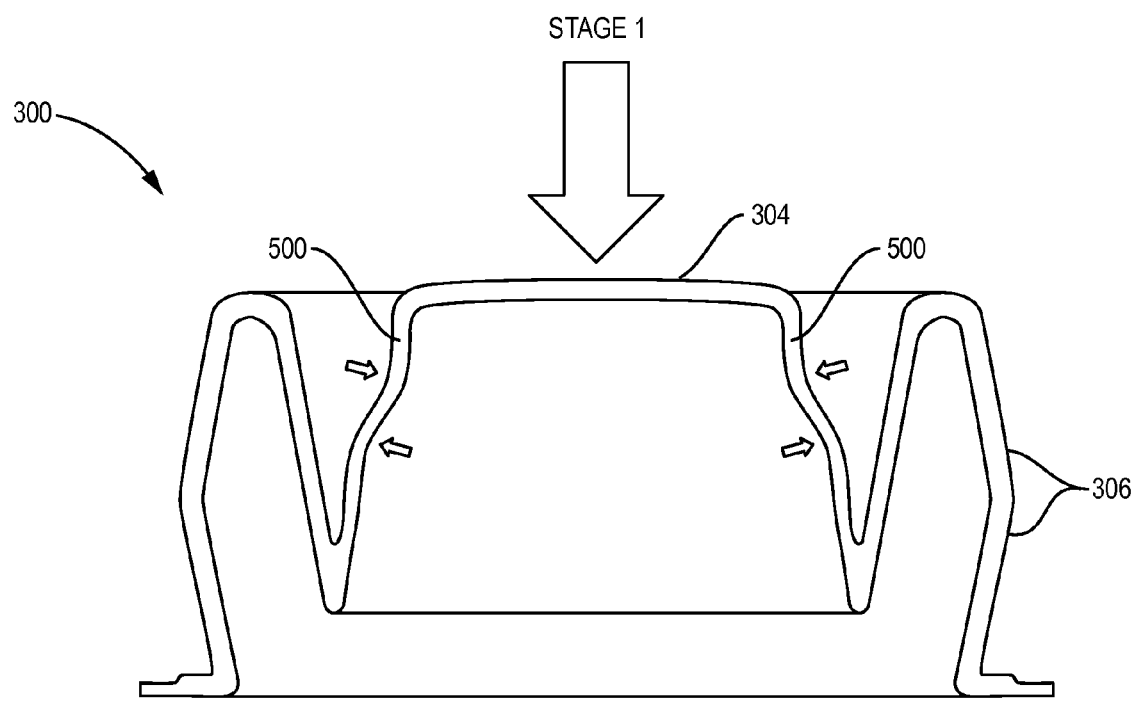
Figure 4C:
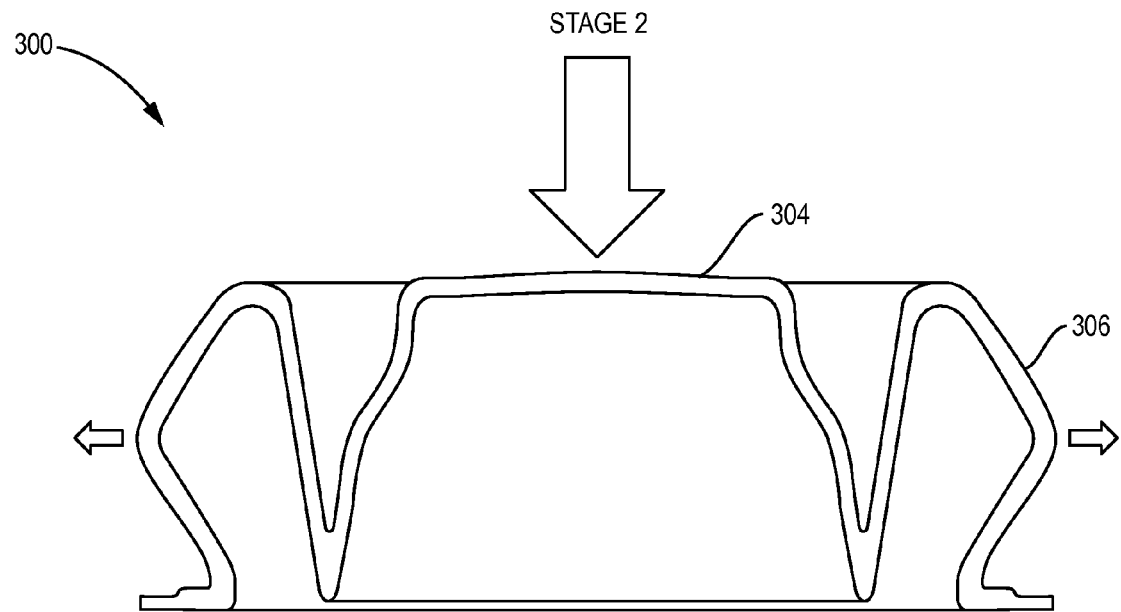
Figure 4D:
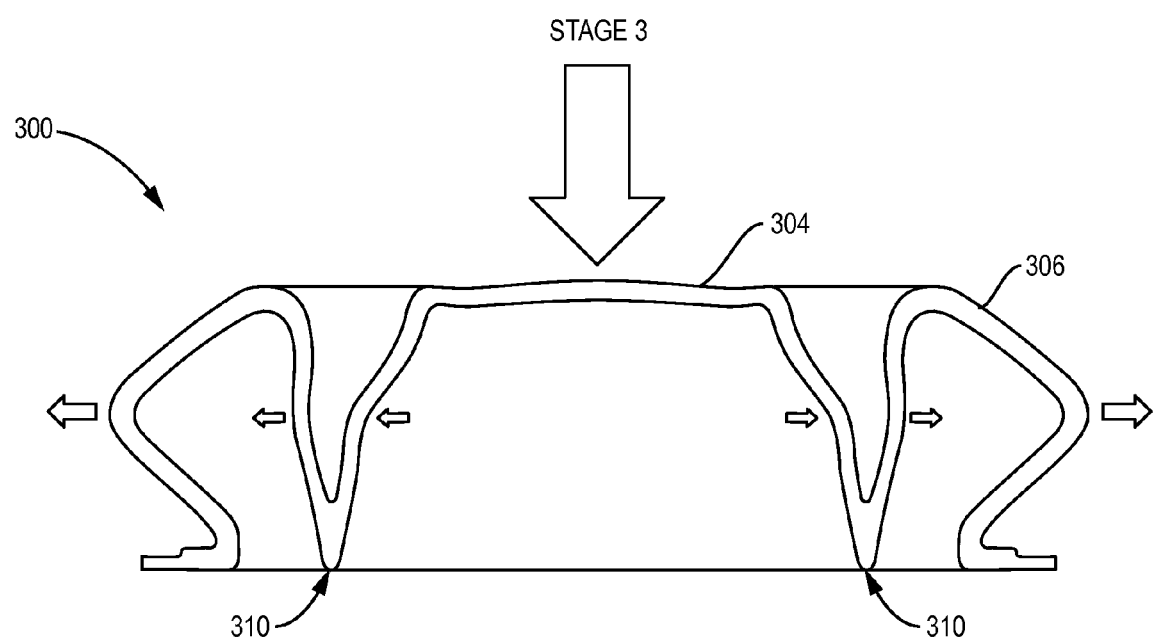
Figure 4E:
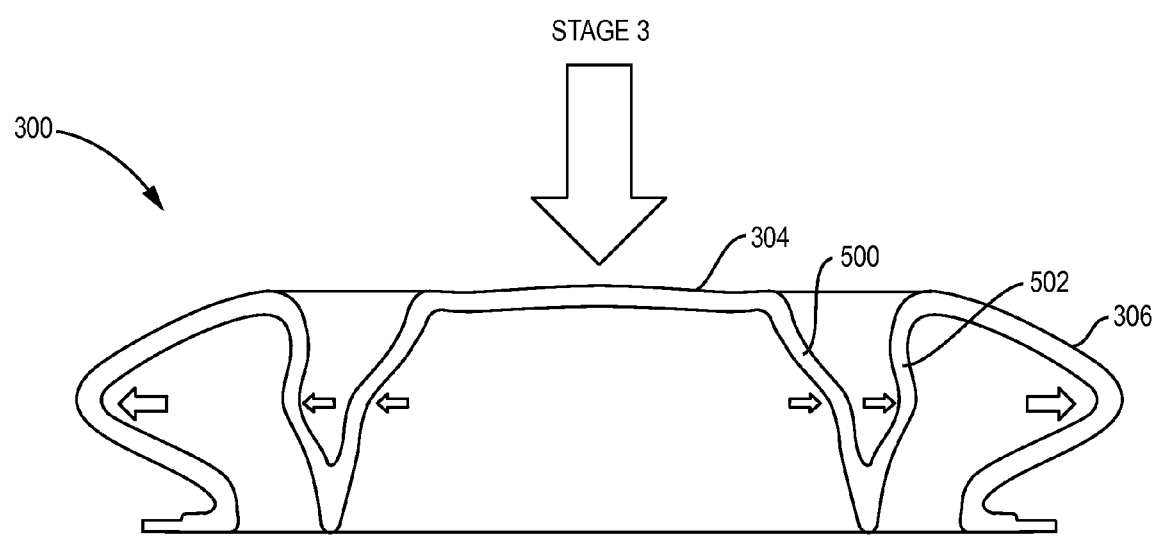

FIGS. 4A-4E illustrate various compression stages of the shock absorber cap 300. FIG. 4A shows the shock absorber in the uncompressed state. FIG. 4B illustrates the first compression stage, in which the central portion 304 of the top wall is depressed due to impact forces imparted thereon. The interior walls 500 of the corrugation buckle to allow for such depression. Once the central portion 304 has been lowered to about the height of the side wall 306, the side wall 306 begins to buckle (outwardly, in the depicted embodiment), as shown in FIG. 4C; this side-wall yielding attenuates the impact throughout the second compression stage, which lasts until the trough 310 of the corrugation 308 contacts the bottom surface (shown in FIG. 4D). Following contact, which marks the beginning of the third compression stage, the side wall 306 of the enclosure and the interior and exterior walls 500, 502 of the corrugation 308 jointly absorb the impact by buckling further. In effect, the compression cell now has three approximately concentric vertical walls; each additional corrugation would add another two effective walls. In embodiments where the side wall 306 of the cell encloses an interior obtuse angle and, therefore, collapses outwardly (as shown), the walls 500, 502 of the corrugations tend to likewise move outwardly. For cells with side walls that toe in at the medial plane (as illustrated in FIGS. 1A and 1B), the walls of the corrugation would, instead, tend to move inwardly.

Impact absorption in multiple stages may serve to increase the range of impact forces over which the shock absorber is effective. Small impacts may be absorbed, to a large extent, by depression of the central portion 304 of the top wall 302 and the accompanying buckling of the inner wall 500 of the corrugation, whereas larger impacts may quickly proceed to the second and/or third stages, where the side walls 306 and both walls 500, 502 of the corrugation resist compression. As will be readily appreciated by one of skill in the art, the shock absorber can be designed to absorb impact forces in more than three stages, e.g., by addition of more corrugations. Conversely, a two-stage absorber may be constructed by using a top wall 302 that is, apart from the corrugation, flat, i.e., does not include a raised portion. Additional features and shock-absorbing mechanisms, e.g., as described herein, may be incorporated into a shock absorber with deep corrugations. For instance, as shown in FIG. 3A, the shock absorber may include a fluid-venting orifice 314. Resistive fluid-venting may provide an impact-absorbing mechanism that works in parallel with the structural resistance via the enclosure. Alternatively, the shock absorber may form an enclosure without any openings, resulting in pressure increase inside the shock absorber as it is compressed, or an enclosure with an opening that allows free fluid flow in and out of the shock absorber, eliminating any fluid-dynamic resistance to compression.

Figure 5:
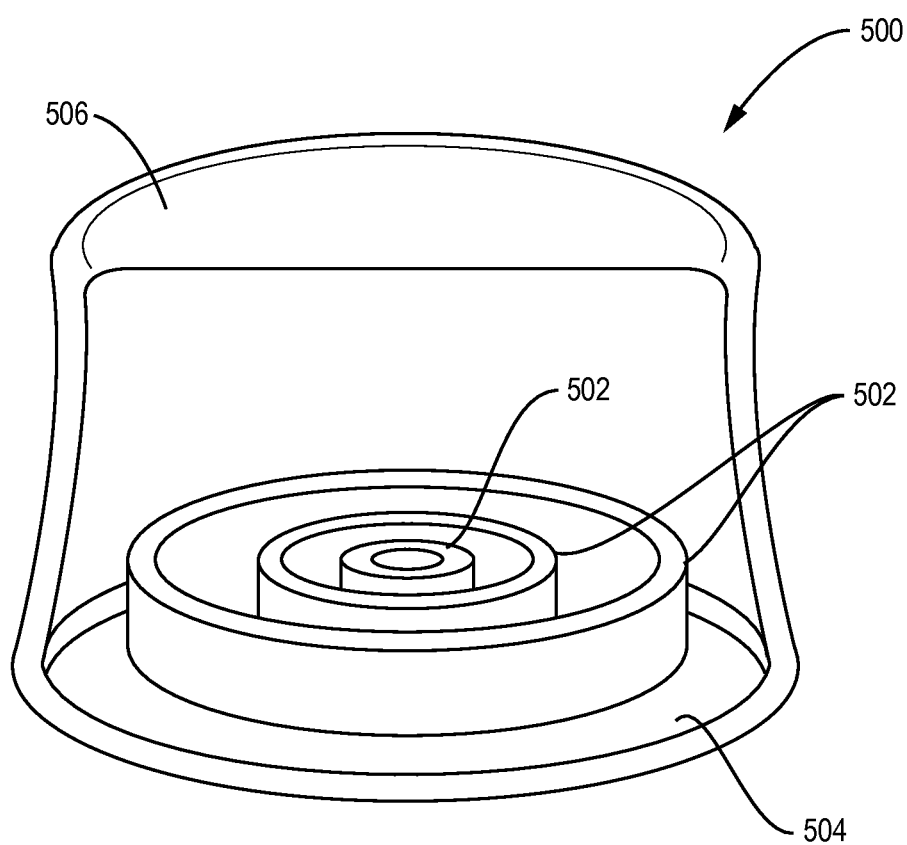
FIG. 5 is a schematic cut-away view of a shock absorber enclosure in accordance with one embodiment, which features nested cylindrical walls protruding from the bottom wall.

FIG. 5 illustrates another design for a shock-absorbing cell 500, in which a plurality of concentric circular ridges 502 are arranged on the bottom wall 504. When the top wall reaches these ridges 502 during compression of the cell 500, the ridges 502 begin contributing to the absorption of the impact, resulting in a higher overall resistance of the shock absorber to compression. The above-described corrugations and vertically protruding features are merely examples; corrugations and protrusions of different shapes and configurations, attached to the top wall, the bottom wall, or both, may likewise be used to achieve similar effects.

Figure 6A:
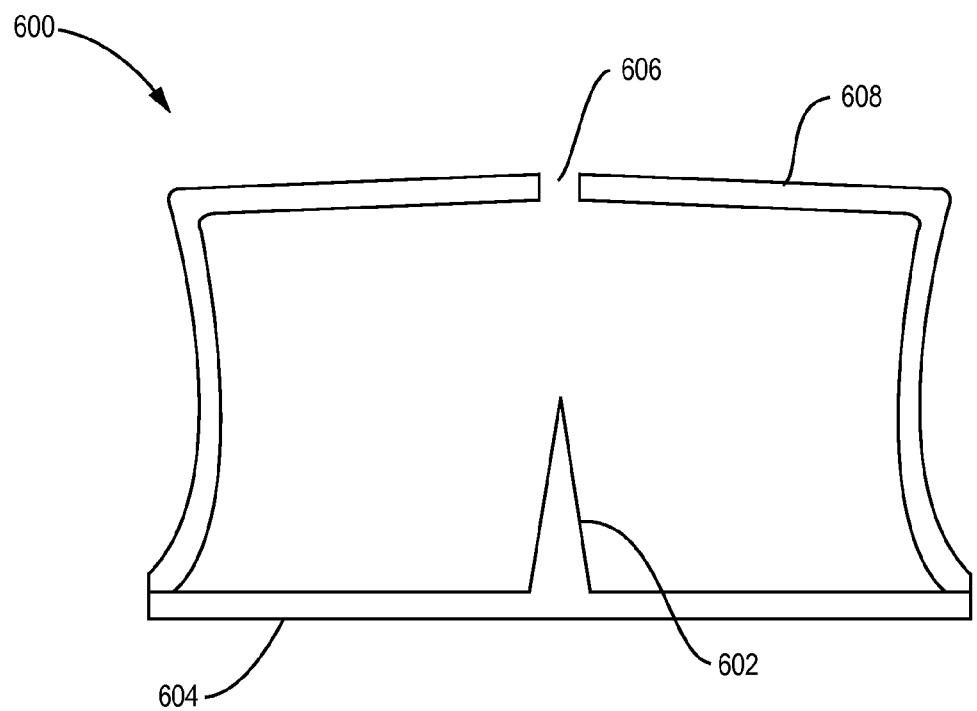
FIG. 6A is a is a schematic cross-sectional view of a shock absorber enclosure in accordance with one embodiment, which features a pin protruding from the bottom wall opposite an orifice through the top wall.
Figure 6B:
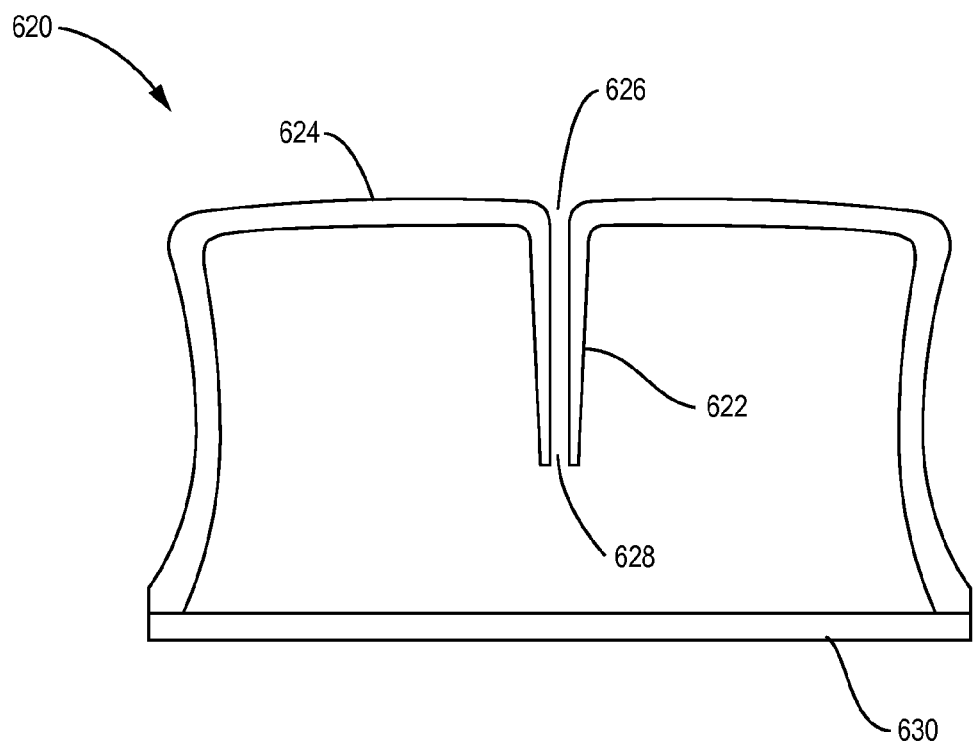
FIG. 6B is a schematic cross-sectional view of a shock absorber enclosure in accordance with one embodiment, which features a tubular protrusion extending from the top wall and surrounding an orifice therethrough.

FIGS. 6A and 6B illustrate shock absorbers in which the configuration of the orifice and, consequently, the rate of fluid flow therethrough change depending on the compression state of the cell. For example, FIG. 6A shows a compression cell that includes a long, conical pin 602 protruding from bottom wall 604 opposite an orifice 606 through the top wall 608. Once the cell 600 has been sufficiently compressed in response to the impact (e.g., to about half its original height as shown in the figure), the pin 602 is received within and penetrates the orifice 606, thereby reducing the area through which fluid can escape. Eventually the pin 602 completely obstructs the orifice, preventing any further fluid-venting. Thus, the orifice 606 and pin 602 together function as a valve.

FIG. 6B shows an alternative embodiment 620, in which valve-like behavior is created by a tubular protrusion 622 that extends vertically downward from the top wall 624 and includes a lumen 626 therethrough. The tubular protrusion 622 can restrict fluid-venting via two mechanisms. As can be readily seen, fluid venting through the lumen 626 requires the fluid to enter the tube 622 at the end 628 close to the bottom wall 630. Accordingly, as this end 628 contacts the bottom wall, venting is precluded or at least inhibited. In addition, and generally more importantly, the tube 622 can be made of a thickness and material that allows it to constrict and self-restrict the orifice in response to increased fluid turbulence, much like a balloon that releases air through the opening.

Figure 7:
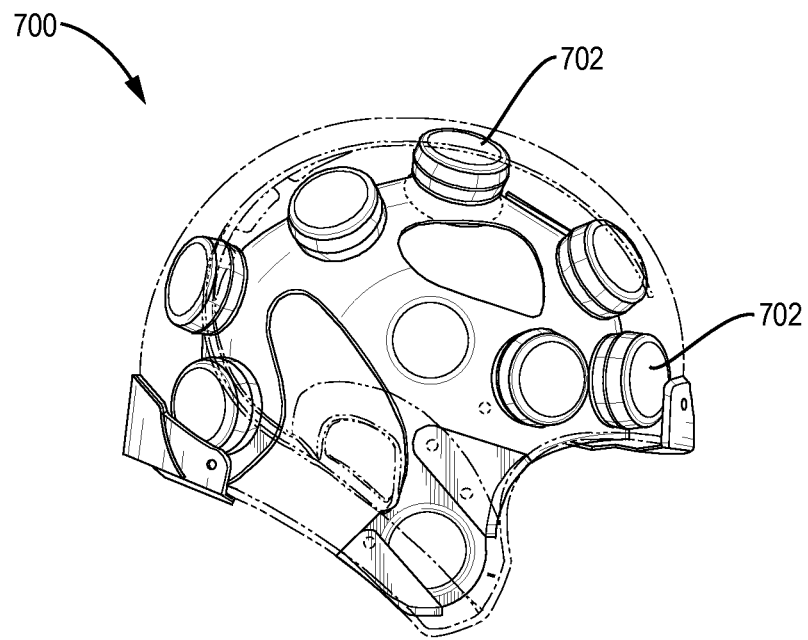
FIG. 7 is an elevational view of a protective helmet with multiple distributed compression cells in accordance with one embodiment.
Figure 8A:
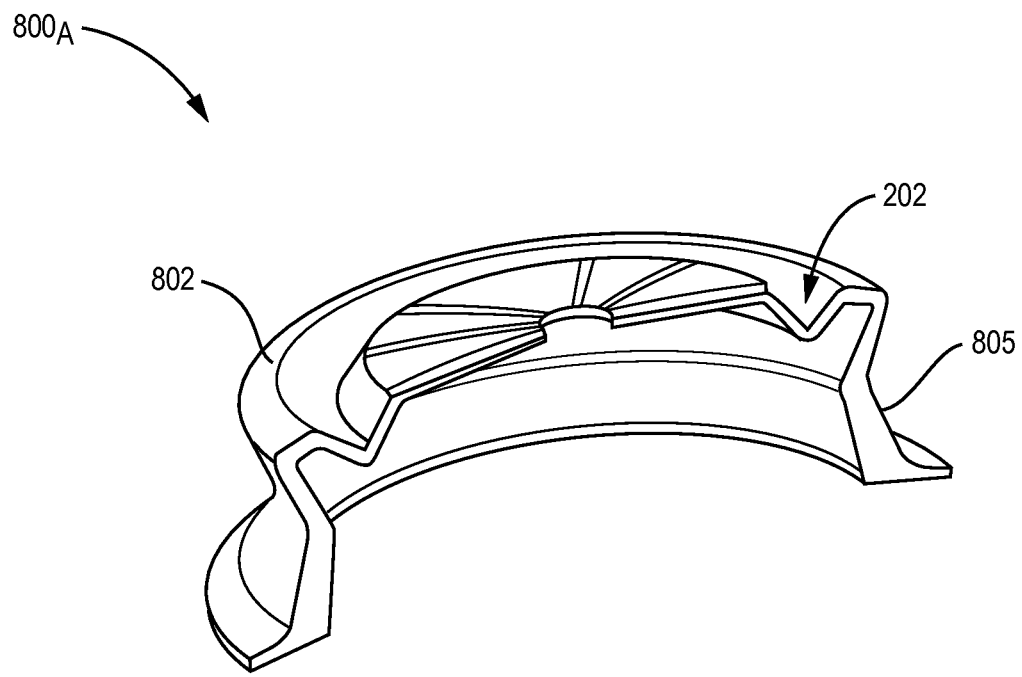
FIG. 8A is a perspective sectional view of a shock absorber enclosure in accordance with one embodiment, side walls of varying thickness, a rounded top wall, and corrugations along the circumference of the top wall.

Shock absorbers as described above may employed advantageously in a variety of applications, including, for example, protective body gear, vehicle dash boards, and shock-absorbing seats. FIG. 7 illustrates, as one exemplary application, a protective helmet 700 including multiple compression cells 702 distributed between a shell and a helmet liner. The shock absorbers 702 may include any combination of the features described above. Further, they may be shaped to accommodate the space between the shell and liner. For example, FIG. 8A shows a shock absorber cap $800_A$ (omitting the bottom wall) that has an elevated, rounded top wall 802 with a curvature complementary to that of the interior surface of the helmet shell. Further, the shock absorber features one or more "V-shaped" corrugations 502 around the periphery of a center portion of the top wall 802, and inwardly angled side walls 805 with that increase in thickness toward the bottom. The rounded top wall and corrugation(s) cooperate to allow the cell top to shift laterally in response to shear forces.

Figure 8B:
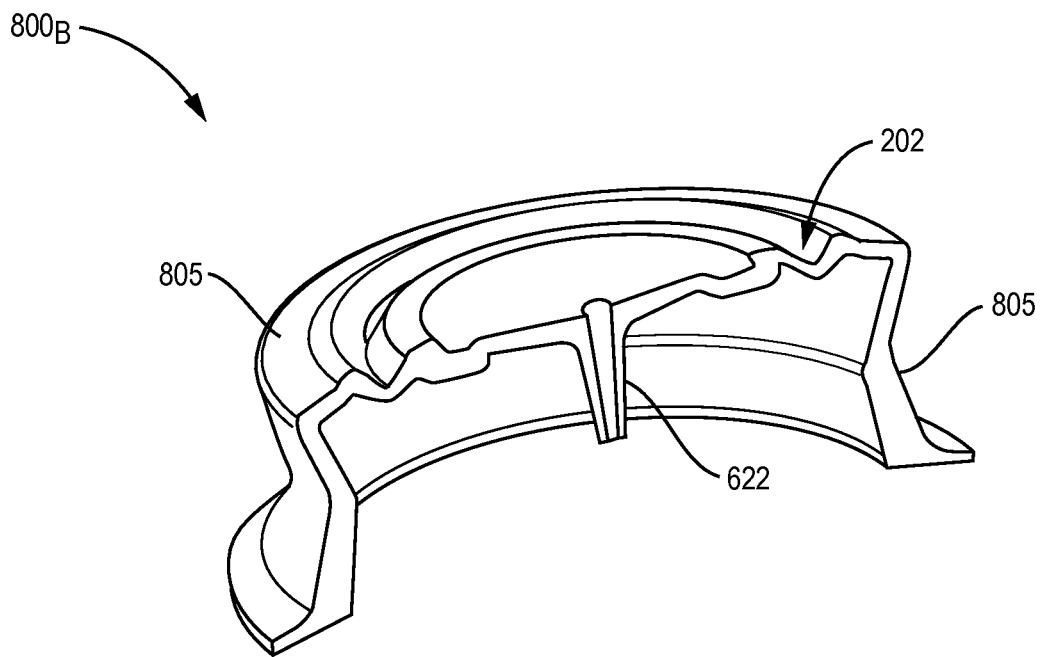
FIG. 8B is a perspective sectional view of a shock absorber enclosure similar to that of FIG. 8A, which further tapers off toward one side so as to better fit into peripheral space of a protective helmet.

FIG. 8B illustrates a shock absorber $800_B$ suitable for use in areas of the helmet that curve back in toward the head, e.g., the occipital lock area on the back of the helmet and the areas on the lower sides. The shock absorber $800_B$ has an elevated, rounded top wall 802 with a curvature complementary to that of the interior surface of the helmet shell. Further, the shock absorber features one or more "V-shaped" corrugations 802 in the top wall 802, and inwardly angled side walls 805 that increase in thickness toward the bottom. The enclosure of this shock absorber tilts toward one side, i.e., the side wall height decreases across a diameter of the shock absorber such that, properly placed, it sits flush against the shell. The shock absorber $800_B$ includes a tubular protrusion 622 that extends vertically downward from the top wall 802 and includes a lumen therethrough. The radial grooves illustrated in FIGS. 8A and 8B are vents that permit air to travel over the surface of the shock absorber upon impact.

Figure 8C:
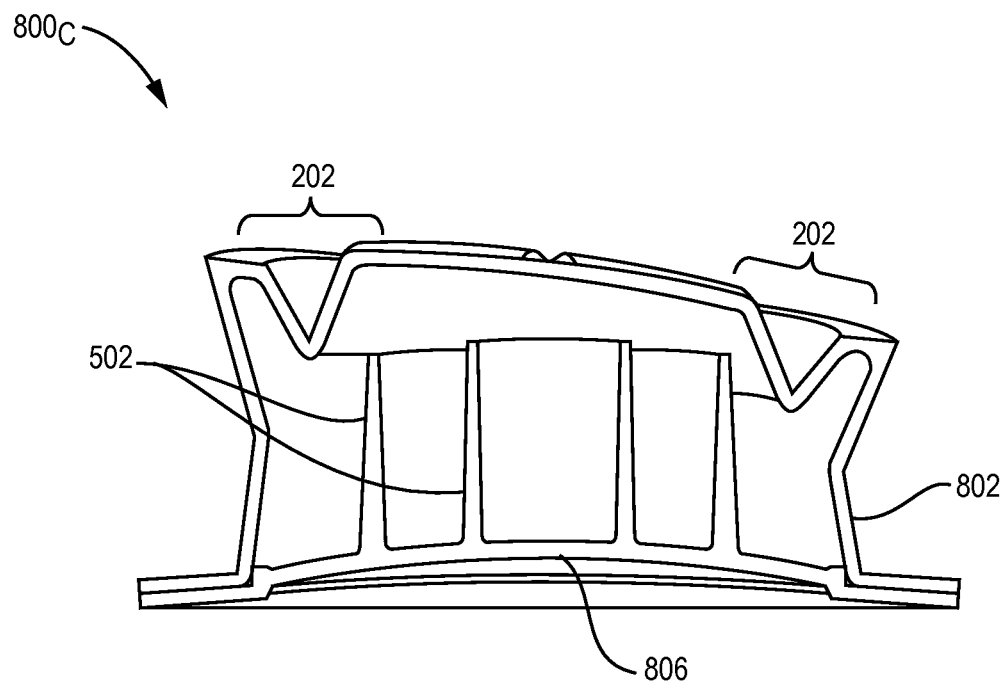
FIG. 8C is a sectional view of a shock absorber enclosure in accordance with another embodiment, which features varying wall thickness, corrugations along the circumference of the top wall, and a valve protruding from the top wall.

FIG. 8C illustrates another shock-absorbing cell $800_C$ having side walls whose collective height decreases across a diameter of the shock absorber to conform to a space of non-uniform height. This cell combines side walls 802 toeing in toward a medial plane and increasing in thickness toward the bottom, corrugations 802 in the top wall, and a plurality of concentric circular ridges 502 arranged on the bottom wall 806. These features cooperate to increase the cell's resistance to compression as a highly compressed state is reached and, thus, collectively increase the energy levels that can effectively be absorbed without increasing the height of the shock absorber structure.

Certain embodiments of the present invention are described above. It is, however, expressly noted that the present invention is not limited to those embodiments; rather, additions and modifications to what is expressly described herein are also included within the scope of the invention. Moreover, it is to be understood that the features of the various embodiments described herein are not, in general, mutually exclusive and can exist in various combinations and permutations, even if such combinations or permutations are not made express herein, without departing from the spirit and scope of the invention. In fact, variations, modifications, and other implementations of what is described herein will occur to those of ordinary skill in the art without departing from the spirit and the scope of the invention. As such, the invention is not to be defined only by the preceding illustrative description.

What is claimed is:

1. A compressible cell for attenuating impact forces imparted thereto in three stages, the cell comprising:
    a hollow enclosure comprising
        (a) a top wall having (i) a raised central portion and (ii) at least one corrugation around a periphery of the raised central portion,
        (b) a bottom wall, and
        (c) a side wall extending between the top and bottom walls, the at least one corrugation descending to a depth below half a height of the side wall,
    whereby impact forces imparted on the cell are attenuated in a first stage by resistive yielding of part of the at least one corrugation to allow for depression of the central portion, in a second stage by resistive yielding of the side wall, and in a third stage, upon contact of the at least one corrugation with the bottom wall, by resistive yielding of the at least one corrugation.

2. The cell of claim 1, wherein the enclosure is configured to cause overlap in time between the first, second, and third stages.

3. The cell of claim 1, wherein the side wall comprises two frusto-conical wall portions meeting at an intermediate plane of the cell.

4. The cell of claim 3, wherein inner surfaces of the two frusto-conical wall portions include an obtuse angle.

5. The cell of claim 3, wherein the two frusto-conical wall portions meet at about half the height of the side wall.

6. The cell of claim 1, further comprising an orifice in the top wall for venting fluid from an interior of the cell.

7. The cell of claim 1, wherein the enclosure is substantially cylindrically symmetric.

8. The cell of claim 1, wherein the at least one corrugation forms two ring walls meeting at a trough of the corrugation.

\* \* \* \* \*